May 17, 1927.                W. C. STEPP                1,628,813
                        TIRE INFLATING APPARATUS
                        Filed Dec. 4, 1925        2 Sheets-Sheet 2
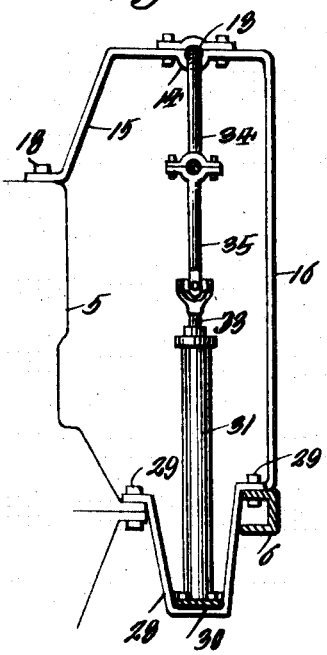
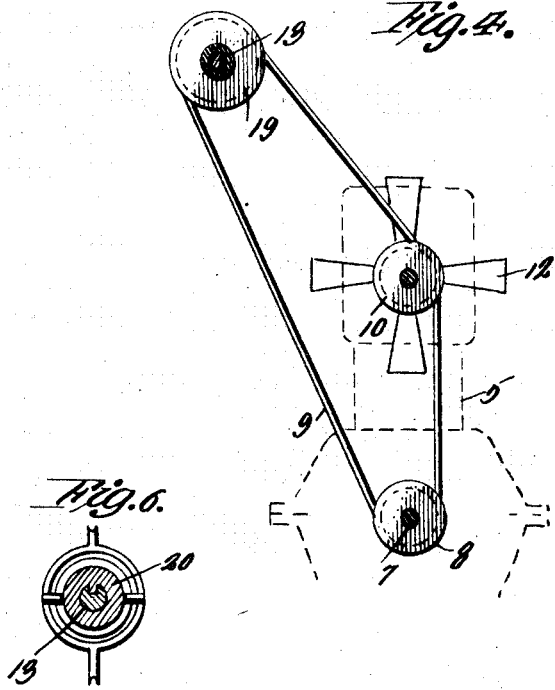
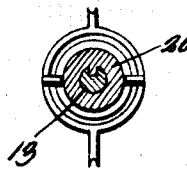
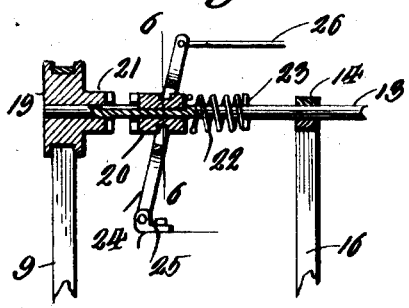
WITNESSES
Inventor
WILLIAM C. STEPP
By Richard B. Owen, Attorney Patented May 17, 1927.

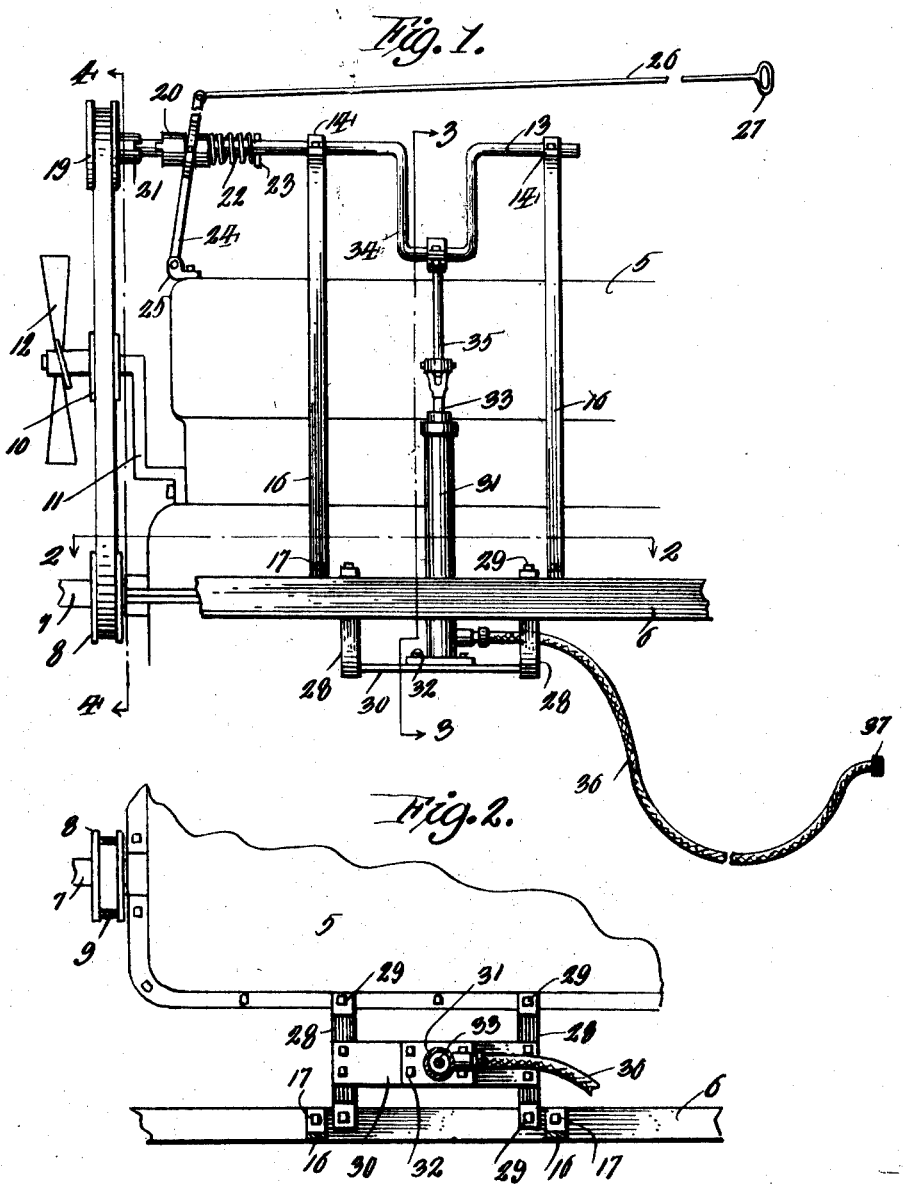

UNITED STATES PATENT OFFICE.

WILLIAM C. STEPP, OF PENELOPE, TEXAS.

TIRE-INFLATING APPARATUS.

Application filed December 4, 1925. Serial No. 73,232.

This invention relates to tire inflating apparatus, and has more particular reference to a device of this kind embodying an attachment for a motor vehicle which includes a reciprocating air pump and means for operatively connecting the pump to the vehicle engine.

The primary object of the invention is to provide a tire inflating apparatus of the above kind which is extremely simple and durable in construction as well as efficient in operation.

A further object is to provide a tire inflating apparatus of the above kind including simple and durable means for mounting a reciprocating air pump upon the vehicle and for placing the same in operative relation to the vehicle engine so that the pump may be rendered operative or inoperative at will.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views.

Figure 1 is a fragmentary side elevational view illustrating a tire inflating apparatus constructed in accordance with the present invention and operatively associated with a motor vehicle frame and engine.

Figure 2 is a fragmentary horizontal section taken substantially upon line 2—2 of Figure 1.

Figure 3 is a vertical section taken substantially upon line 3—3 of Figure 1.

Figure 4 is a vertical section taken substantially upon line 4—4 of Figure 1.

Figure 5 is a fragmentary longitudinal sectional view illustrating details of the invention relative to the means for rendering the pump operative or inoperative at will, and Figure 6 is a section taken substantially upon line 6—6 of Figure 5.

Referring more in detail to the drawings, 5 indicates a conventional form of internal combustion engine forming part of the power plant of a motor vehicle whose frame includes longitudinal or side frame rails, one of which is shown at 6 extending along one side of the engine 5. The engine 5 has a forwardly projecting crank-shaft 7 upon which is secured the usual pulley 8 around which passes a driving belt 9 which also passes over a further pulley 10 that is mounted upon a bracket 11 above the pulley 8 and is adapted to drive the usual fan 12 which draws the air rearwardly through the usual radiator, not shown, for cooling the water in the engine cooling system as is well known in the art.

In accordance with the present invention, a longitudinally extending crank-shaft 13 is journaled in a horizontal position at one side of the engine 5 and preferably at an elevation above the top of the engine as shown. The shaft 13 is preferably supported by bearings 14 provided in the upper transversely extending end portions 15 of a pair of rigid uprights or vertical bars 16 whose lower ends are rigidly secured at spaced points to the frame rail 6 of the vehicle by bolting or the like as at 17. The free ends of the transversely extending portions 15 of the uprights 16 may be bolted to the cylinder head of the engine as indicated at 18 whereby the shaft 13 is more rigidly mounted, and the shaft 13 projects forwardly of the forward standards 16 where it has a pulley 19 journaled thereon about which the belt 9 also passes. Slidably keyed on the forward end portion of the shaft 13 is a clutch element 20 adapted to engage a cooperating clutch element 21 on the hub of the pulley 19 for causing the rotation of pulley 19 to be transmitted to the shaft 13. The clutch element 20 is normally slid forwardly into engagement with the clutch element 21 by means of a helical compression spring 22 which surrounds the shaft 13 between the rear end of the clutch element 20 and a suitable abutment 23 carried by the shaft 13.

A clutch shifting lever 24 is hinged at its lower end as at 25 upon the top of the engine 5 and is also operatively engaged with the clutch element 20 so that when said lever 24 is swung rearwardly against the action of the spring 22, the clutch element 20 will be disengaged from the clutch element 21 and allow the pulley 19 to freely rotate without causing rotation of shaft 13. The upper end of the lever 26 may be pivoted to the forward end of a longitudinal pull-rod 26 adapted to extend transversely through the dash-board of the vehicle where it is equipped with a suitable handle 27 for facilitating its manipulation. It will thus be seen that the construction provides for normally driving the shaft 13 from the engine crank-shaft through the medium of a belt which causes operation of the usual cooling fan, and it is of course, intended that a suitable means be provided for association with the rod 26 for holding the same in clutch releasing position against the action of the spring 22 so that when said rod 26 is released the spring 22 will immediately cause the clutch elements 20 and 21 to engage for causing the shaft 13 to be driven.

A pair of stirrups 28 are suspended from and disposed between the crank case of the engine 5 and the adjacent side rail 6 of the vehicle frame. These stirrups preferably have out-turned end portions which are bolted to the engine and the frame rail as at 29, and a longitudinal horizontal platform 30 has its ends secured upon the intermediate lower portions of the stirrups 28. The stirrups are thus connected by the platform 30 and the latter acts as a support upon which the base of a conventional reciprocating air-pump 31 is rigidly secured by bolting or the like as at 32. The pump 31 is thus rigidly supported in a vertical position at one side of the engine, and said pump embodies a reciprocating piston rod 33 whose upper end is operatively connected with a crank 34 of the shaft 13 by means of a pitman 35. The crank 93 preferably disposed between the uprights or standards 16 directly above the pump 21 as shown, and the pump is provided with the usual flexible outlet tube 36 which has a connection 37 at its free end for engagement with the tire-valve as is well known in the art. The flexible conduit or hose 36 is of such length as to reach all of the tires of the vehicle so that the same may be pumped up without removal from the wheels.

In operation, the hose 36 is connected with the tire valve and the rod 26 is then released so that the clutch element 20 engages the clutch element 21. When the engine is started in operation the rotation of pulley 8 is transmitted to the pulley 19 through the medium of the belt 9, and by means of the engagement of the clutch elements 20 and 21, shaft 13 is rotated. The crank and pitman connection between the shaft 13 and the piston rod of the pump 31 causes the piston of the air-pump to be reciprocated so that the compressed air is supplied to the tires through the conduit 36.

From the above description it will be seen that I have provided a very simple, durable and efficient means for effecting inflation of the tires of a vehicle with facility and ease.

Minor changes may be made without departing from the spirit and scope of the invention as claimed.

What I claim as new is:

1. An attachment for motor vehicles comprising a pair of standards having base portions adapted for securing to the frame of a motor vehicle, said standards having their upper ends provided with alined bearings, a crank shaft journalled in said bearings and having a crank between the bearings adapted for connection to a pump, said crank shaft being provided on its forward end with a belt pulley adapted to receive the belt of a motor vehicle.

2. An attachment for motor vehicles comprising a pair of standards having base portions adapted for securing to the frame of a motor vehicle, said standards having their upper ends provided with alined bearings, a crank shaft journalled in said bearings and having a crank between the bearings adapted for connection to a pump, said crank shaft being provided on its forward end with a belt pulley adapted to receive the belt of a motor vehicle, said belt pulley being freely revoluble on said crank shaft, a sleeve splined on said crank shaft, the pulley and sleeve being provided with coacting clutch faces, a spring surrounding said crank shaft and bearing against the sleeve to urge the same toward the pulley, and means to retract the sleeve from the pulley.

3. An attachment for motor vehicles comprising a pair of standards having base portions adapted for securing to the frame of a motor vehicle, said standards having their upper ends provided with alined bearings, a crank shaft journalled in said bearings and having a crank between the bearings adapted for connection to a pump, said crank shaft being provided on its forward end with a belt pulley adapted to receive the belt of a motor vehicle, said belt pulley being freely revoluble on said crank shaft, a sleeve splined on said crank shaft, the pulley and sleeve being provided with coacting clutch faces, a spring surrounding said crank shaft and bearing against the sleeve to urge the same toward the pulley, said sleeve having a circumferential groove intermediate its ends, a bracket adapted for connection to a fixed part of the motor vehicle, a shipper lever pivoted at one end to said bracket and provided with means engaging in said groove, and a pull rod attached to the remaining end of said shipper lever.

In testimony whereof I affix my signature.

WILLIAM C. STEPP.